United States Patent
Nabeshima

(10) Patent No.: US 12,197,652 B2
(45) Date of Patent: Jan. 14, 2025

(54) CONTROL DEVICE AND CONTROL METHOD WITH SET PRIORITIES FOR INPUT OPERATIONS IN COMPETITIVE RELATIONSHIP

(71) Applicant: CANON KABUSHIKI KAISHA, Tokyo (JP)

(72) Inventor: Rui Nabeshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/244,966

(22) Filed: Sep. 12, 2023

(65) Prior Publication Data

US 2024/0103629 A1 Mar. 28, 2024

(30) Foreign Application Priority Data

Sep. 28, 2022 (JP) .................. 2022-154733

(51) Int. Cl.
*G06F 3/01* (2006.01)
*G06F 3/033* (2013.01)

(52) U.S. Cl.
CPC ............. *G06F 3/017* (2013.01); *G06F 3/011* (2013.01); *G06F 3/014* (2013.01); *G06F 3/033* (2013.01); *G06F 2203/0331* (2013.01); *G06F 2203/0381* (2013.01)

(58) Field of Classification Search
CPC .......... G06F 3/014; G06F 3/033; G06F 3/011; G06F 2203/0331; G06F 2203/0381
See application file for complete search history.

(56) References Cited

U.S. PATENT DOCUMENTS

| | | | |
|---|---|---|---|
| 9,047,698 B2 | 6/2015 | Maciocci et al. |
| 9,142,062 B2 | 9/2015 | Maciocci et al. |
| 9,384,594 B2 | 7/2016 | Maciocci et al. |
| 10,444,834 B2 | 10/2019 | Vescovi et al. |
| 10,627,902 B2 | 4/2020 | Vescovi et al. |
| 2012/0249416 A1 | 10/2012 | Maciocci et al. |
| 2012/0249544 A1 | 10/2012 | Maciocci et al. |

(Continued)

FOREIGN PATENT DOCUMENTS

| | | |
|---|---|---|
| JP | H08-241163 A | 9/1996 |
| JP | 2015-194794 A | 11/2015 |

(Continued)

OTHER PUBLICATIONS

Feb. 1, 2024 Extended Search Report in European Patent Application No. 23 197 383.5.

(Continued)

*Primary Examiner* — Liliana Cerullo
(74) *Attorney, Agent, or Firm* — Venable LLP

(57) ABSTRACT

A control device includes at least one memory and at least one processor which function as: a reception unit configured to be capable of receiving an input operation by an operation device that is a wearable-type device and an input operation by hand tracking; and a determination unit configured to determine which of the input operation by the operation device and the input operation by the hand tracking is employed as an input operation used to control an information processing system on a basis of priorities set in advance when simultaneously receiving the input operation by the operation device and the input operation by the hand tracking.

16 Claims, 7 Drawing Sheets

(56) References Cited

U.S. PATENT DOCUMENTS

| | | |
|---|---|---|
| 2012/0249590 A1 | 10/2012 | Maciocci et al. |
| 2012/0249591 A1 | 10/2012 | Maciocci et al. |
| 2012/0249741 A1 | 10/2012 | Maciocci et al. |
| 2012/0319940 A1 | 12/2012 | Bress et al. |
| 2013/0088419 A1 | 4/2013 | Kim et al. |
| 2014/0267022 A1 | 9/2014 | Kim |
| 2015/0054630 A1* | 2/2015 | Xu ................. G06F 3/04883 340/12.5 |
| 2015/0277559 A1 | 10/2015 | Vescovi et al. |
| 2016/0011660 A1* | 1/2016 | Wieder ............ H04N 21/44227 345/158 |
| 2017/0060230 A1 | 3/2017 | Faaborg et al. |
| 2018/0164892 A1 | 6/2018 | Han et al. |
| 2018/0329512 A1* | 11/2018 | Liao ..................... G06F 3/012 |
| 2019/0011979 A1 | 1/2019 | Faaborg et al. |
| 2019/0391645 A1 | 12/2019 | Vescovi et al. |
| 2020/0241641 A1 | 7/2020 | Vescovi et al. |
| 2022/0253146 A1 | 8/2022 | Erivanteev et al. |
| 2022/0413640 A1 | 12/2022 | Kawamae |
| 2023/0127549 A1* | 4/2023 | Xu ........................ G06F 3/0338 345/156 |
| 2023/0315202 A1* | 10/2023 | Poulos ..................... G06F 3/013 345/156 |

FOREIGN PATENT DOCUMENTS

| | | |
|---|---|---|
| JP | 2018-523200 A | 8/2018 |
| JP | 2020-061169 A | 4/2020 |
| WO | 2012/135553 A1 | 10/2012 |
| WO | 2015/153803 A1 | 10/2015 |
| WO | 2018/043722 A1 | 3/2018 |
| WO | 2021/005715 A | 1/2021 |

OTHER PUBLICATIONS

Sep. 10, 2024 Office Action in Japanese Patent Application No. 2022-154733 (with English translation).

* cited by examiner

FIG. 6

| PRIORITY | INPUT OPERATION | COMMAND |
|---|---|---|
| 1 | THREE-DIMENSIONAL POSITION AND ATTITUDE FOR DISPLAYING RAY OF XX CONTROLLER (RIGHT) | POINTER POSE |
| 2 | THREE-DIMENSIONAL POSITION AND ATTITUDE FOR DISPLAYING RAY OF YY CONTROLLER (RIGHT) | POINTER POSE |
| 3 | THREE-DIMENSIONAL POSITION AND ATTITUDE FOR DISPLAYING RAY OF HAND TRACKING (RIGHT HAND) | POINTER POSE |

CONTROL DEVICE AND CONTROL METHOD WITH SET PRIORITIES FOR INPUT OPERATIONS IN COMPETITIVE RELATIONSHIP

BACKGROUND OF THE INVENTION

Field of the Invention

The present invention relates to a control device and a control method.

Description of the Related Art

As means for operating the display of a head-mounted display (HMD) in a cross reality (XR) system that lets a user experience virtual reality, a method using an operation device such as a hand controller, a method using hand tracking, or the like has been known.

In the former method, a user performs an input operation on an HMD by changing the position/attitude of an operation device or by operating an operation member such as a button provided in the operation device. As such, an operation device (called a grip type, a hand-held type, or the like) formed into a shape gripped by a hand has been generally used but a small operation device (also called a wearable type or the like) attachable to a hand or a finger has also been proposed (see WO 2015/153803). In the latter method, hand tracking is performed in such a manner that a hand of a user is recognized from an image captured by a camera and the position, attitude, gesture, or the like of the hand is grasped as an input operation. For example, WO 2012/135553 discloses a control method for an HMD by the input of a gesture.

The method using an operation device has an advantage that the operation device is not likely to be falsely operated (secured operation is easy), while the method using hand tracking has an advantage that an intuitive operation is made possible by a hand or a finger. Conventionally, some XR systems are capable of switching between an operation mode using an operation device and an operation mode by hand tracking.

The present inventor has hit upon an idea that the convenience or operability of an XR system may be further improved if the mode of an operation device and the mode of hand tracking are not selectively switched but both an operation by the operation device and an operation by the hand tracking are receivable. Particularly, in the case of a wearable type, a hand is not hidden by the operation device (a part of the hand is not in a blind spot of a camera), and the hand or a finger is freely movable during the use of the operation device. Therefore, it appears that both the operation device and hand tracking are easily used in combination.

However, the present inventor has faced the following problem in the combined use of an operation device and hand tracking. For example, when a user operates an operation device to input a command, there is a possibility that a hand by which the operation device is retained (or the hand to which the operation device is attached) moves and the movement of the hand is accidentally interpreted as the input of a command by hand tracking. Conversely, when the user performs a hand gesture, there is a possibility that the position or attitude of an operation device retained by (or attached to) a hand changes and the change is accidentally interpreted as the input of a command by the operation device. In such a case, the input of a command by an operation device and the input of a command by hand tracking are simultaneously recognized (detected), the malfunction of control or unintended behavior may occur in an XR system.

SUMMARY OF THE INVENTION

The present invention has been made in view of the above circumstances, and provides a technology to make it possible to perform an input operation by an operation device and an input operation by hand tracking in combination.

The present disclosure includes a control device including at least one memory and at least one processor which function as: a reception unit configured to be capable of receiving an input operation by an operation device that is a wearable-type device and an input operation by hand tracking; and a determination unit configured to determine which of the input operation by the operation device and the input operation by the hand tracking is employed as an input operation used to control an information processing system on a basis of priorities set in advance when simultaneously receiving the input operation by the operation device and the input operation by the hand tracking.

Further features of the present invention will become apparent from the following description of exemplary embodiments with reference to the attached drawings.

BRIEF DESCRIPTION OF THE DRAWINGS

FIG. 6 is a diagram showing an example of a priority table; and

DESCRIPTION OF THE EMBODIMENTS

Hereinafter, embodiments will be described in detail with reference to the accompanying drawings. Note that the following embodiments do not intend to limit the invention according to claims. A plurality of features are described in the embodiments, but all of them are not necessarily essential for the invention. Further, the plurality of features may be arbitrarily combined together. In addition, the same or similar configurations are denoted by the same reference symbols, and their duplicated descriptions are omitted in the accompanying drawings.

Figure 1:
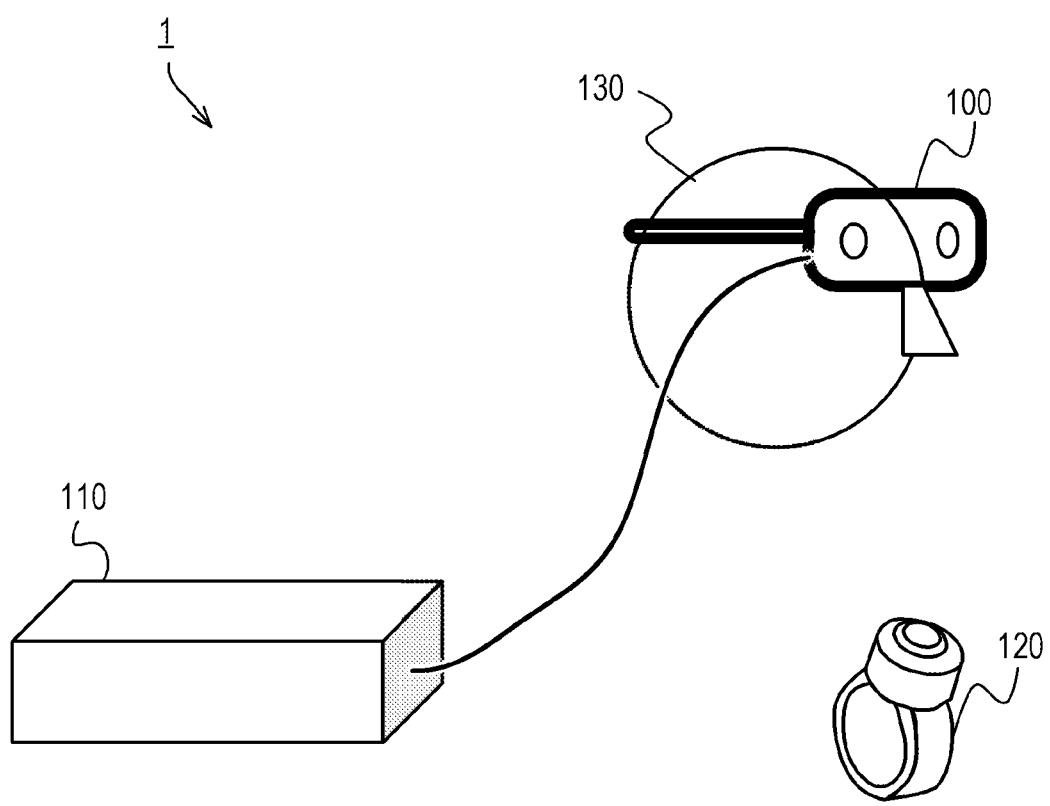
FIG. 1 is a diagram for describing the entire configuration of an information processing system.

(Entire System Configuration) An information processing system 1 according to an embodiment of the present invention will be described with reference to FIG. 1. The information processing system 1 has an HMD 100, an image processing device 110, and an operation device 120. The information processing system 1 is an XR system used to let a user have a pseudo experience (Cross Reality: XR) in which a real world and a virtual world are merged. The XR includes virtual reality (VR), augmented reality (AR), mixed reality (MR), substitutional reality (SR), or the like, but the information processing system 1 is applicable to any type of XR content.

The HMD 100 is a head-mounted-type display device (electronic equipment) attached to a head 130 of a user. On the HMD 100, a combined image in which an image of a range in front of the user captured by the HMD 100 and a content such as a computer graphic (CG) in a mode corresponding to the attitude of the HMD 100 are combined together is displayed.

The image processing device 110 is a control device (electronic equipment) that is responsible for performing processing such as the control of the HMD 100, the processing of a captured image photographed by a camera mounted in the HMD 100, the generation of a content such as a CG, and the generation of a combined image displayed on the HMD 100. The image processing device 110 is constituted by a computer including a CPU (processor) and a memory. For example, a smart phone, a tablet terminal, a personal computer (PC), video game equipment, or the like is usable as the image processing device 110. The image processing device 110 is connected to the HMD 100 in a wireless or wired fashion. The image processing device 110 generates a combined image by combining a captured image with a CG, and transmits the combined image to the HMD 100. Note that the respective configurations of the image processing device 110 may be embedded in the HMD 100.

The operation device 120 is a device used to input instructions (command) to the HMD 100. When the information processing system 1 is in a specific control mode, a command corresponding to a predetermined input operation (action) is received by the information processing system 1 and the HMD 100 or the image processing device 110 is controlled as the user performs the input operation using the operation device 120.

The operation device 120 is also called a "hand controller" or simply a "controller." A controller formed into a shape gripped (held) by a hand of the user is called a grip-type controller, a hand-held-type controller, or the like. A controller used in a state of being attached to a hand or a finger of the user is called a wearable-type controller or the like. In the present embodiment, the operation device 120 of a ring type as shown in FIG. 1 is, for example, used so as to be attachable to a finger of the user. The operation device 120 attachable to a finger of the user has an advantage that the user is enabled to freely move a hand or the finger while holding the operation device 120, and that the hand is not likely to be hidden by the operation device 120. The operation device 120 has a button in which an "optical track pad (hereinafter called and "OTP") is embedded. The operation device 120 performs wireless communication with the image processing device 110 through Bluetooth™.

Note that the shape of the operation device 120 is the ring type as described above but is not limited to this. For example, the shape of the operation device 120 may be a shape such as a grove type attachable to a hand or a shape such as a wristwatch type (bracelet type) attachable to a wrist. As described above, the operation device 120 may have a shape capable of being retained by a hand of the user or attachable to the hand or a wrist so as to be easily used by the user. FIG. 1 shows only the one operation device 120. However, a plurality of operation devices may be provided to operate the HMD 100. For example, an operation device for a right hand and an operation device for a left hand may be provided, or operation devices may be attached to a plurality of fingers (for example, a thumb, an index finger, or the like).

The operation device 120 may include any operating member instead of an OTP so long as the user is capable of performing an operation through physical contact. For example, the operation device 120 may include any of a touch pad, a touch panel, a cross key, a button, a joystick, and a track pad device instead of an OTP. Alternatively, if only a change in the position and/or attitude of the operation device 120 itself is used as an operation by the operation device 120, an OTP or other operating members may not be provided.

Figure 2:
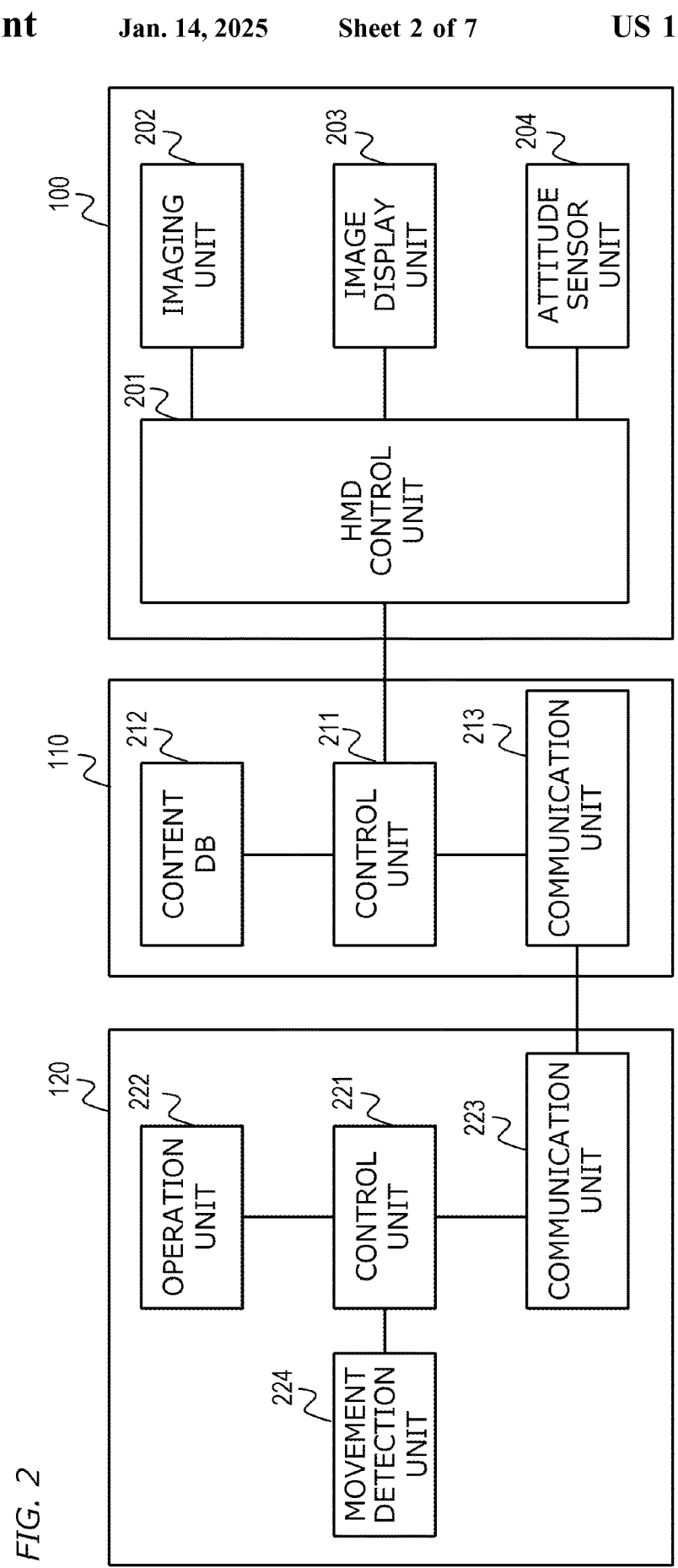
FIG. 2 is a diagram for describing the internal configurations of the information processing system.

(Internal Configurations of HMD) The internal configurations of the HMD 100 will be described with reference to FIG. 2. The HMD 100 has an HMD control unit 201, an imaging unit 202, an image display unit 203, and an attitude sensor unit 204.

The HMD control unit 201 controls the respective configurations of the HMD 100. When acquiring a combined image (an image in which a captured image of a space in front of a user captured by the imaging unit 202 and a CG are combined together) from the image processing device 110, the HMD control unit 201 displays the combined image on the image display unit 203. The user is enabled to see the combined image displayed on the image display unit 203 with the HMD 100 attached thereto. The user is enabled to experience various mixed realities such as one in which a CG is merged with a reality space.

The imaging unit 202 may include two cameras (imaging devices). In order to capture an image of the same space as a space seen by the user at a normal time, the two cameras are arranged near the positions of the right and left eyes of the user when the HMD 100 is attached to the user. Images of a subject (a range in front of the user) captured by the two cameras are output to the image processing device 110. Further, the two cameras of the imaging unit 202 are enabled to acquire information on distances from the two cameras to a subject as distance information by ranging based on stereo cameras.

The image display unit 203 displays a combined image. The image display unit 203 has, for example, a display panel constituted by a liquid-crystal panel, an organic EL panel, or the like. In a state in which the HMD 100 is attached to the user, the display panel is disposed in front of the respective right and left eyes of the user.

The attitude sensor unit 204 detects the attitude (and position) of the HMD 100. Then, the attitude sensor unit 204 detects (acquires) the attitude of the user (user to which the HMD 100 is attached) that corresponds to the attitude (and position) of the HMD 100. The attitude sensor unit 204 has an inertial measurement unit (IMU). The attitude sensor unit 204 outputs information (attitude information) on the attitude of the user to the image processing device 110.

(Internal Configurations of Image Processing Device) The internal configurations of the image processing device 110 will be described with reference to FIG. 2. The image processing device 110 is a control device having a control unit 211, a content database (DB) 212, and a communication unit 213.

The control unit 211 receives an image (captured image) acquired by the imaging unit 202 and attitude information acquired by the attitude sensor unit 204 from the HMD 100. The control unit 211 performs image processing to cancel the aberration between the optical system of the imaging unit 202 and the optical system of the image display unit 203 on the captured image. Then, the control unit 211 combines the captured image with any CG to generate a combined image. The control unit 211 transmits the combined image to the HMD control unit 201 in the HMD 100.

Note that the control unit 211 controls the position, direction, and size of a CG in a combined image on the basis of information (distance information and attitude information) acquired by the HMD 100. For example, when arranging a virtual object indicated as a CG near a specific object existing in a reality space in a space expressed by a combined image, the control unit 211 sets the virtual object (CG) to be larger as the distance between the specific object and the imaging unit 202 is closer. By controlling the position, direction, and size of a CG like this, the control unit 211 is enabled to generate a combined image as if a CG virtual object not existing in a reality space were arranged in the reality space.

Further, the control unit 211 performs the reception of an input operation by the operation device 120, the reception of an input operation by hand tracking using a captured image acquired from the HMD 100, the display control of the HMD 100 based on input operations, or the like. The details of processing associated with input operations will be described later.

The content DB 212 is a storage unit that stores information such as a CG. Note that the control unit 211 is capable of switching a CG read from the content DB 212 (that is, a CG used to generate a combined image).

(Internal Configurations of Operation Device) The internal configurations of the operation device 120 will be described with reference to FIG. 2. The operation device 120 has a control unit 221, an operation unit 222, a communication unit 223, and a movement detection unit 224.

The control unit 221 controls the respective configurations of the operation device 120. The control unit 221 may be constituted by a small general-purpose processor, a memory, and a program, or may be constituted by a dedicated microprocessor, an ASIC, or the like.

The operation unit 222 includes a button in which an OTP is embedded. Information (operation information) on the depression or sliding of a finger with respect to the OTP in the operation unit 222 is transmitted to the image processing device 110 via the communication unit 223.

For example, a user is enabled to move a pointer displayed on the HMD 100 to a predetermined position by sliding a finger on the OTP. Further, the user is enabled to give instructions to perform specific processing to the HMD 100 or the image processing device 110 by depressing the button of the OTP. As described above, the user is enabled to control the HMD 100 by a combination of the sliding of a finger and the depression of the button on the OTP.

The communication unit 223 performs wireless communication with the image processing device 110 (the communication unit 213).

The movement detection unit 224 has an inertial measurement unit (IMU) (inertial sensor) enabled to detect inertial information (a spatial movement amount or an angle) on the operation device 120. In the present embodiment, the movement detection unit 224 uses an IMU that includes a three-axis (x, y, z) acceleration sensor and a three-axis gyro sensor, and that is capable of acquiring inertial information on six degrees of freedom of motion in x, y, and z directions and rotation about x, y, and z axes. The inertial information is transmitted to the image processing device 110 via the communication unit 223. Note that the movement detection unit 224 may have any device so long as the device does not hinder the miniaturization of the operation device 120 and is enabled to detect inertial information (information such as a position displacement, a speed, and acceleration).

(Operations by Hand Tracking and Operation Device) The information processing system 1 of the present embodiment supports both an operation by the operation device 120 and an operation by hand tracking.

The operation by the operation device 120 refers to a method for inputting a command (instructions) to the HMD 100 in such a manner that a user changes the position or attitude of the operation device 120 or operates an operation member such as an OPT provided in the operation device 120. The type of an input operation by the operation device 120 includes, for example, the following variations.

Moving the operation device 120 to a predetermined position or region

Moving the operation device 120 in a predetermined direction (translational movement)

Moving the operation device 120 so as to draw a predetermined track

Moving the operation device 120 under a predetermined speed condition (for example, moving the operation device 120 slowly, tilting the operation device 120 quickly, or the like)

Turning the operation device 120 in a predetermined direction (to have a predetermined attitude) (rotation)

Depressing a button (pressing, half-pressing, long-pressing, double click, pressing a plurality of buttons simultaneously, or the like)

Indicating a direction by an operation member such as an OPT and a cross key

The operation by hand tracking refers to a method for inputting a command (instructions) to the HMD 100 according to the position, attitude, or movement of a hand or finger of the user. The input operation by hand tracking is recognized when a hand of the user to which the HMD 100 is attached is detected and the position, attitude, movement (gesture), or the like of the hand is grasped from images captured by the imaging unit 202 of the HMD 100. The type of the input operation by hand tracking includes, for example, the following variations.

Moving a hand to a predetermined position or region

Moving a hand in a predetermined direction

Moving a hand so as to draw a predetermined track

Moving a hand under a predetermined speed condition (for example, moving the hand slowly, tilting the hand quickly, or the like)

Turning a hand in a predetermined direction (to have a predetermined attitude)

Forming a predetermined shape by a hand or a finger (for example, thumbs-up, peace sign, or the like)

Making predetermined movement by a hand or a finger (for example, pinching, clenching, waving, or the like)

When receiving (recognizing) an "input operation" by the operation device 120 or hand tracking, the information processing system 1 (the image processing device 110) converts the input operation into a "command" and performs the control of the HMD 100 based on the command. The command refers to control instructions to the information processing system 1 (the HMD 100). For example, abstract instructions (for example, "SELECT," "NEXT," "MOVE," or the like) used to operate a GUI displayed on the HMD 100 or operate a virtual object may be prepared as the command.

For example, the user is capable of pressing the button of the operation device 120 for a long period of time to cause a menu to be displayed on the HMD 100, pressing the button of an OTP after moving a pointer to a desired item by the operation of the OTP, and determining the selection of the item. Further, the user is also capable of realizing the same operation only by hand tracking. Moreover, the user may display the menu through the operation of the operation device 120, and perform the selection or determination of an item by hand tracking. In this manner, the user is also capable of combining an operation by the operation device 120 and an operation by hand tracking together.

The corresponding relationship (mapping) between input operations and commands is set in advance in the information processing system 1 as will be described later. The information processing system 1 converts (translates) a received input operation into a command according to the setting. Note that the corresponding relationship between the input operations and the commands may be freely set by the user. Further, even in the same movement, each of a case in which an operation is performed by a right hand, a case in which an operation is performed by a left hand, and a case in which an operation is performed by both hands may be assigned to a different command. As described above, there are various types of input operations by the operation device 120 and input operations by hand tracking, but the information processing system 1 is not required to correspond to all the types. The information processing system 1 may appropriately implement receivable (recognizable) input operations according to purposes, functions, or contents.

(Examples of Operations by Hand Tracking) First, an example of controlling the HMD 100 using hand tracking corresponding to the position of a hand of the user will be described.

The control unit 211 of the image processing device 110 determines (recognizes) the position, attitude, and movement of a finger of a hand on the basis of the color and shape of the hand of the user reflected in a captured image. Then, the control unit 211 controls the HMD 100 according to the position of the hand (for example, the distance between the finger of the hand and a CG) in a space expressed by a combined image. In a method for recognizing a hand and a finger from an image, any algorithm may be used. For example, classical machine learning as represented by support vector machine may be used, an algorithm based on deep learning such as R-CNN may be used, or a rule-based algorithm may be used.

Figure 3A:
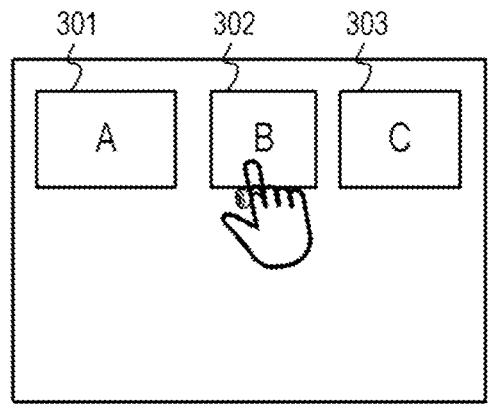
FIGS. 3A to 3C are diagrams showing a display example of an HMD.

For example, as shown in FIG. 3A, the control unit 211 displays a CG of panels 301 to 303 showing three alternatives on a combined image, and calculates the distances between the three panels 301 to 303 and the fingertip of an index finger of a hand in a space expressed by the combined image. Then, when a state in which the distance between any of the three panels 301 to 303 and the fingertip is not more than a predetermined distance continues over a predetermined time, the control unit 211 determines that the panel has been selected. Then, the control unit 211 performs determination processing corresponding to the selected panel. In the example of FIG. 3A, the fingertip of the index finger of the right hand of the user is placed on the panel 302. When this state continues over, for example, at least one second, the control unit 211 interprets that a command (instructions) for selecting the panel 302 has been input and performs processing B assigned to the panel 302.

Figure 3B:
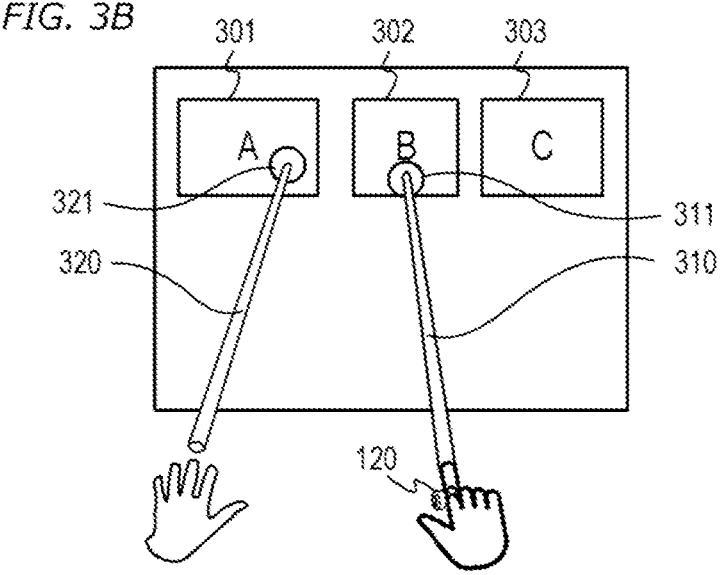

Next, an example of controlling the HMD 100 using a virtual ray corresponding to the direction of a hand of the user will be described with reference to FIG. 3B. The control unit 211 controls the HMD 100 according to the position of a virtual ray on the extension of the direction of a hand of the user.

The control unit 211 of the image processing device 110 determines (recognizes) the direction of a hand on the basis of the color and shape of the hand of the user reflected in a captured image. At this time, the control unit 211 displays a CG of a ray extending in a direction indicated by the hand on the image display unit 203 as shown in FIG. 3B. Then, the control unit 211 causes a pointer to be displayed (moved to) at a position in which the ray is directed. Therefore, the user is enabled to change the position and direction of the ray and the position of the pointer by changing the direction of the hand. In the example of FIG. 3B, a pointer 311 of a ray 310 of a right hand indicates the panel 302, and a pointer 321 of a ray 320 of a left hand indicates the panel 301.

Figure 3C:
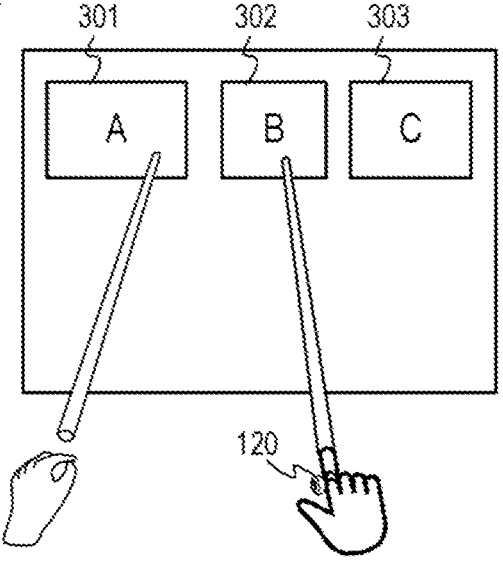

When the user performs a pinch gesture (pinching operation by fingers) with the left hand in a state in which the pointer 321 is displayed on the panel 301 as shown in FIG. 3C, the control unit 211 determines that the panel 301 has been selected. Then, the control unit 211 performs determination processing corresponding the selected panel 301. The pinch gesture is described above as an example, but the user may perform a selection operation by a hand gesture other than a pinch.

Information acquired from the inertial measurement unit (IMU) (inertial sensor) provided in the operation device 120 attached to a hand of the user may be used to control the direction of a ray. For example, the control unit 211 may determine the direction of a ray using information on the direction of the operation device 120 acquired from the IMU instead of information on the direction of a hand acquired by hand tracking. Alternatively, the control unit may increase a matching rate between a direction indicated by the user and a direction in which a ray extends on the basis of both information on the inclination or acceleration of the operation device 120 acquired from the IMU and information such as the direction of a finger determined from an image.

Figure 4:
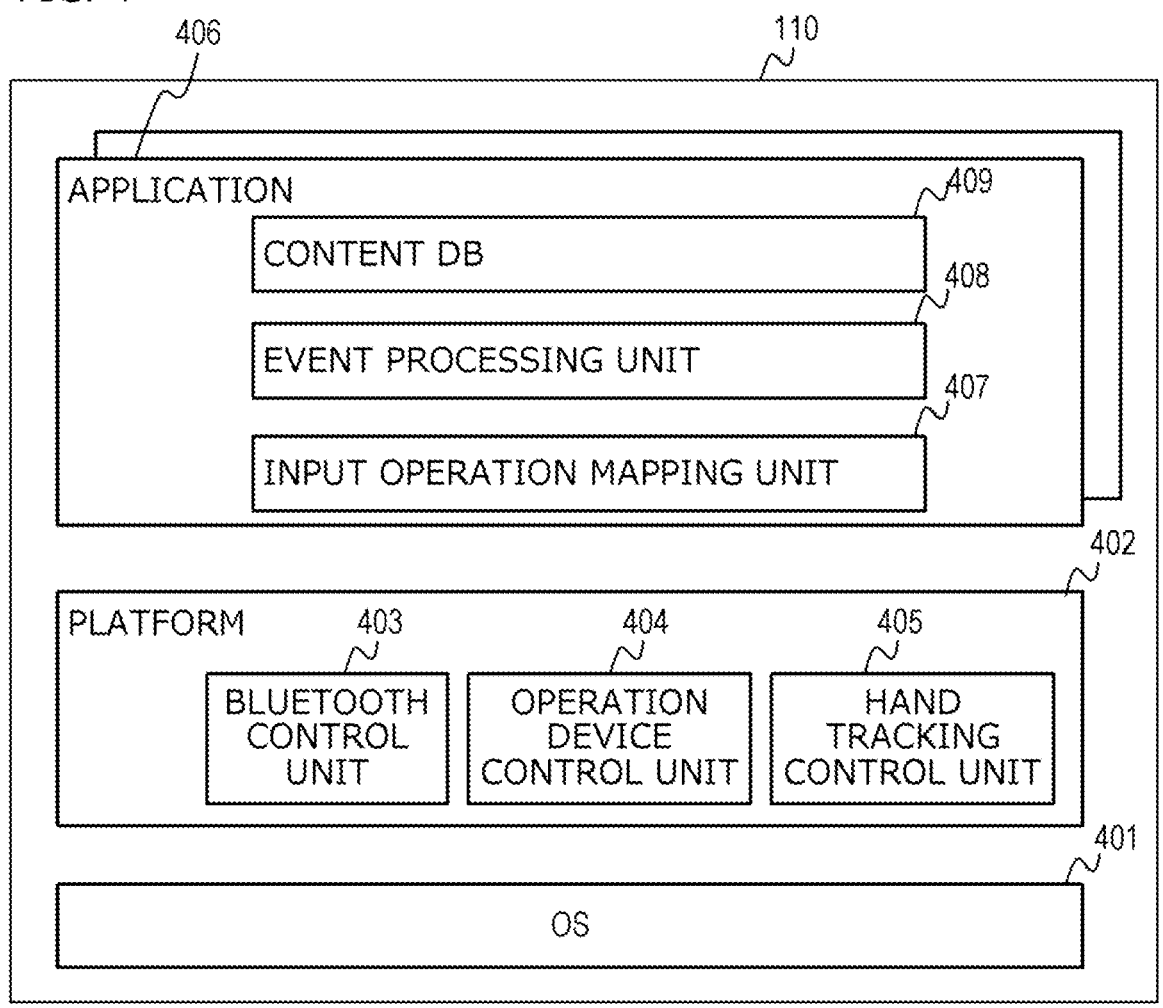
FIG. 4 is a diagram showing the software configurations of an image processing device.

(Configurations of Software Platform of Image Processing Device 110) Next, the software configurations of the image processing device 110 according to an embodiment will be described with reference to FIG. 4.

A platform 402 may be configured on, for example, Android™ by Google LLC or OS 401 such as Linux™. The platform 402 includes a group of device drivers for controlling various hardware, and offers an API for using various hardware to an application 406 that operates on the platform 402. As the group of device drives, a Bluetooth™ control unit 403 exists. Further, the platform 402 also has the function of offering various types of input operation information generated on the basis of data detected by the operation device control unit 404 and the hand tracking control unit 405 to the application 406. The image processing device 110 is enabled to install various applications 406 and cause the same to operate on the OS 401 and the platform 402.

The application 406 includes an input operation mapping unit 407, an event processing unit 408, and a content DB 409. The input operation mapping unit 407 is a conversion unit that converts an input operation (action) by the operation device 120 or hand tracking into abstract information (command) expressing control instructions to the information processing system 1. The event processing unit 408 offers the function of performing processing corresponding to a command when receiving the command from the input operation mapping unit 407. The content DB 409 is the same as the content DB 212 shown in FIG. 2, and stores a CG of a virtual object, a GUI, or the like to be displayed on the HMD 100.

Input operation information from the operation device control unit 404 and/or the hand tracking control unit 405 is notified to the input operation mapping unit 407 and converted into abstract information (command) set in advance. For example, the input operation mapping unit 407 converts information that the A-button of a first operation device has been pressed into abstract information "SELECT." The abstract information is notified to the event processing unit 408 of the application. When responding to a second operation device different from the first operation device, the input operation mapping unit 407 may assign information that the B-button of the second operation device has been pressed to information "SELECT." Thus, the application facilitates response to a plurality of operation devices and various operation devices.

Figure 5:
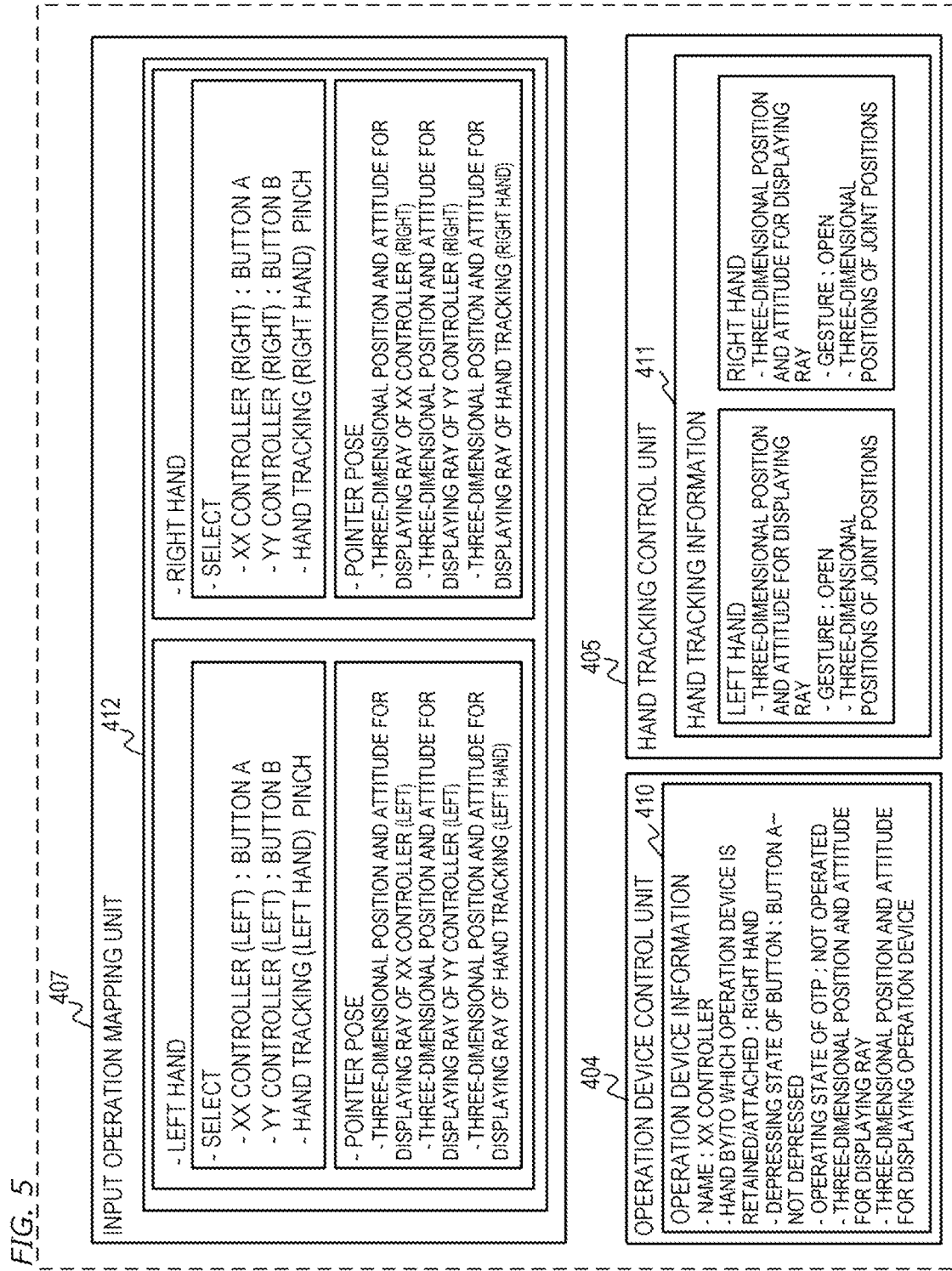
FIG. 5 is a diagram showing an example of information used for the processing of input operations.

FIG. 5 shows an example of input mapping information 412 retained by the input operation mapping unit 407, an example of operation device information 410 retained by the operation device control unit 404, and an example of hand tracking information 411 retained by the hand tracking control unit 405. As shown in FIG. 3B, a case in which a right hand performs a ray operation by the operation device 120 and a left hand does not have an operation device but performs a ray operation according to the direction of the hand will be described as an example.

The operation device control unit 404 has, as the operation device information 410, the name of the operation device 120, a hand (right hand/left hand) by/to which the operation device is retained/attached, the depressing state of a button, the operating state of an OTP, a three-dimensional position and attitude for displaying a ray, and a three-dimensional position and attitude for displaying the operation device. Information such as the depressing state of the button, the operating state of the OTP, and the three-dimensional position and attitude, or the like is updated at a timing at which the operation device 120 is operated or at a fixed time interval (for example, the output rate of the IMU). The position and attitude for displaying a ray is used to display the ray, and the position and attitude for displaying the operation device is used when the operation device is displayed by a CG. The hand by/to which the operation device is retained/attached is determined based on whether the operation device 120 is for a right hand or a left hand. If the operation device 120 is for both the right hand and the left hand, the hand may be determined on the basis of information manually set by the user or may be automatically determined on the basis of a captured image. Retained operation device information is different depending on an operation member mounted in the operation device 120 and a configuration such as a sensor.

The hand tracking control unit 405 has, as the hand tracking information 411, a three-dimensional position and attitude for displaying a ray, a hand gesture, and three-dimensional positions of joint positions for each of a right hand and a left hand. The position and attitude for displaying a ray is used to display the ray. The hand tracking information 411 is updated at a fixed time interval (for example, the frame rate of the imaging unit 202).

The input operation mapping unit 407 has, as the input mapping information 412, a table in which the corresponding relationship between input operation information and commands that are received from the operation device 120 and hand tracking is defined for each of a right hand and a left hand.

Here, two controllers, i.e., an XX controller and a YY controller are available as the operation devices 120. XX controller (RIGHT)" indicates that the XX controller is retained by or attached to the right hand of the user, and "XX controller (LEFT)" indicates that the XX controller is retained by or attached to the left hand of the user. The same applies to the YY controller.

The operation device information 410 of FIG. 5 shows that the XX controller is attached to the right hand of the user and the button and OTP are not operated. Since the YY controller is not used by the user, information on the YY controller is not included in the operation device information 410. Further, the hand tracking information 411 of FIG. 5 shows that both the right hand and the left hand of the user are recognized and an open gesture is being made by both the right hand and the left hand (both the right hand and the left hand are opened).

First, the input mapping information 412 of the left hand will be described. When receiving any of the depression of the button A of the XX controller (LEFT), the depression of the button B of the YY controller (LEFT), and a pinch gesture by hand tracking (left hand), the input operation mapping unit 407 converts the operation into a command "SELECT." The command "SELECT" is notified to the event processing unit 408. When receiving the command "SELECT," the event processing unit 408 performs processing to select an item, virtual object, or the like indicated by the pointer 321 of the left hand. The three-dimensional position and attitude for displaying a ray of the XX controller (LEFT), the three-dimensional position and attitude for displaying a ray of the YY controller (LEFT), and the three-dimensional position and attitude for displaying a ray of hand tracking (left hand) are converted into a command "POINTER POSE." The command "POINTER POSE" is notified to the event processing unit 408 together with three-dimensional position and attitude information, and used to control the ray 320 and the pointer 321 of the left hand.

In the example of the operation device information 410 of FIG. 5, an input operation associated with the left hand does not occur (since an operation device is retained by and attached to only the right hand). In the example of the hand tracking information 411 of FIG. 5, the gesture and three-dimensional position and attitude for displaying a ray of hand tracking (left hand) can be detected as input operations associated with the left hand. For example, the three-dimensional position and attitude for displaying a ray of the left hand of the hand tracking information 411 is updated according to the position and attitude of the left hand. Then, the input operation mapping unit 407 issues a command "POINTER POSE," and the event processing unit 408 updates the drawing positions of the ray 320 and the pointer 321 of the left hand. When it is detected that the user has made a pinch gesture by the left hand, information on the gesture of the left hand of the hand tracking information 411 is updated to a "pinch." Then, the input operation mapping unit 407 issues a command "SELECT," and the event processing unit 408 performs processing to select an item or virtual object placed at the pointer 321 of the left hand.

Next, the input mapping information 412 of the right hand will be described. When any of the depression of the button A of the XX controller (RIGHT), the depression of the button B of the YY controller (RIGHT), and a pinch gesture by hand tracking (right hand) occurs, the input operation mapping unit 407 converts the operation into a command "SELECT." The command "SELECT" is notified to the event processing unit 408. When receiving the command "SELECT," the event processing unit 408 performs processing to select an item, virtual object, or the like indicated by the pointer 311 of the right hand. The three-dimensional position and attitude for displaying a ray of the XX controller (RIGHT), the three-dimensional position and attitude for displaying a ray of the YY controller (RIGHT), and the three-dimensional position and attitude for displaying a ray of hand tracking (right hand) are converted into a command "POINTER POSE." The command "POINTER POSE" is notified to the event processing unit 408 together with three-dimensional position and attitude information, and used to control the ray 310 and the pointer 311 of the right hand.

In the example of the operation device information 410 of FIG. 5, the depression of the button A and the three-dimensional position and attitude for displaying a ray of the XX controller can be detected as input operations associated with the right hand. In the example of the hand tracking information 411 of FIG. 5, the gesture and three-dimensional position and attitude for displaying a ray of hand tracking (right hand) can be detected.

In the present embodiment, both the three-dimensional position and attitude for displaying a ray of the XX controller (RIGHT) and the three-dimensional position and attitude for displaying a ray of hand tracking (RIGHT) are assigned to "POINTER POSE" of the right hand in the input mapping information 412. For example, when the user moves the right hand, a change in the three-dimensional position and attitude for displaying a ray of the XX controller retained by and attached to the right hand and a change in the three-dimensional position and attitude for displaying a ray of hand tracking (right hand) can be simultaneously detected. At this time, no problem arises if the value of the three-dimensional position and attitude acquired from the operation device information 410 of the XX controller matches the value of the three-dimensional position and attitude acquired from the hand tracking information 411 of the right hand, but there is actually a difference between these values. Therefore, two commands of "POINTER POSE" having different values of three-dimensional position and attitude corresponding to control amounts, that is, two commands (control instructions) having contents contradictory to each other can be simultaneously issued. Like this, "a plurality of input operations that may be simultaneously issued (detected) and can be interpreted as commands contradictory to each other" will be called "input operations in a competitive relationship" below. If a plurality of input operations in a competitive relationship are received, there is a possibility that the malfunction of control or unintended behavior occurs.

In the information processing system 1 of the present embodiment, priorities (priority levels) are therefore set in advance for groups of input operations in a competitive relationship. Then, when simultaneously receiving a plurality of input operations in a competitive relationship, the information processing system 1 determines which of the received input operations is employed on the basis of the priorities set in advance. Simply, an input operation with the highest priority among a plurality of received input operations may only be employed. However, a method for employing an input operation is not limited to this. Instead of relying only on priorities, a plurality of evaluation indexes including priorities may be used to employ an input operation. Alternatively, a plurality of input operations may be combined together by weights corresponding to priorities.

FIG. 6 shows an example of a priority table in which the corresponding relationship between priorities, input operations, and commands is defined as a setting example of the priorities. With respect to three input operations assigned to "POINTER POSE" of the right hand, priorities 1 to 3 are set. Note that a priority table is prepared for each group if there are other groups of input operations in a competitive relationship.

The priority table may be set by the user, or may be set when an application creator creates an application. Alternatively, instead of using such a priority table, a rule that an input operation by the operation device 120 is always given a higher priority over an input operation by hand tracking may be defined. This determination based on priorities may be performed by the platform 402, or may be performed by the application 406 (the input operation mapping unit 407 or the event processing unit 408).

Figure 7B:
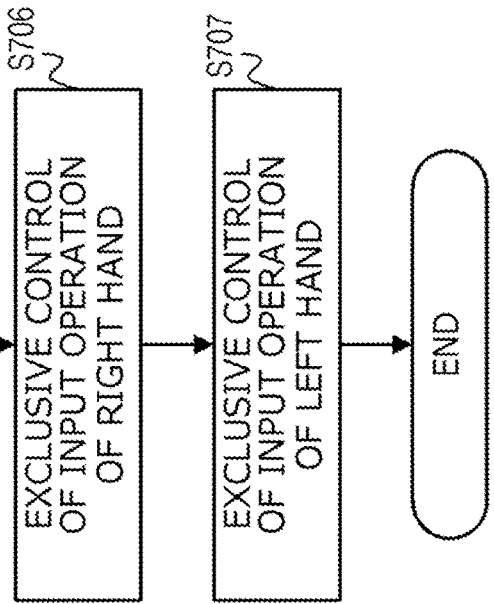
FIGS. 7A and 7B are flowcharts of the processing of input operations.
Figure 7A:
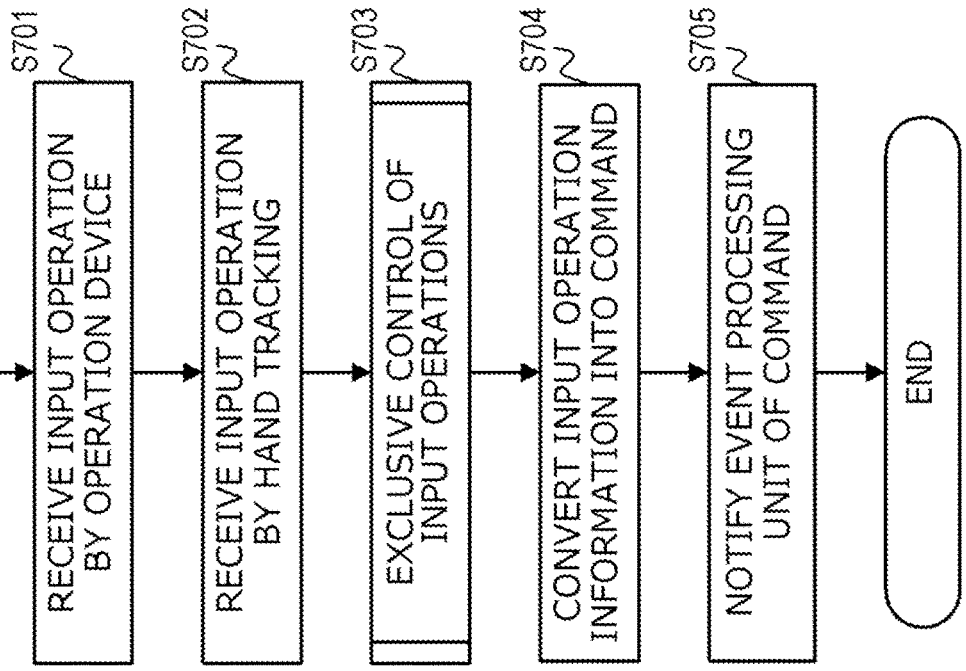

(Processing Example of Input Operations) Next, a processing example of input operations in the present embodiment will be described along the flowcharts of FIGS. 7A and 7B. The processing shown in FIGS. 7A and 7B is repeatedly performed at a predetermined cycle by the image processing device 110.

In step S701, the operation device control unit 404 updates the operation device information 410 on the basis of information acquired from the operation device 120. At this time, the operation device control unit 404 estimates the position and attitude of the operation device 120 from inertial information acquired from the operation device 120, and calculates a three-dimensional position and attitude for displaying a ray and a three-dimensional position and attitude for displaying the operation device. The processing of step S701 corresponds to the reception of an input operation by the operation device 120.

In step S702, the hand tracking control unit 405 performs the estimation of the respective positions, attitudes, joint positions, gestures, or the like of the right hand and the left hand of the user (person to which the HMD 100 is attached) from images captured by the imaging unit 202 of the HMD 100. Then, the hand tracking control unit 405 updates the hand tracking information 411 on the basis of results of the estimation. The processing of step S702 corresponds to the reception of an input operation by hand tracking.

In step S703, the input operation mapping unit 407 performs the exclusive control of the input operation by the operation device 120 and the input operation by the hand tracking received in steps S701 and S702. The exclusive control of input operations corresponds to the determination of any of a plurality of input operations competing with each other when the plurality of input operations are simultaneously received.

In step S704, the input operation mapping unit 407 refers to the input mapping information 412, and converts the input operation determined (employed) in step S703 into a command (control instructions to the information processing system 1).

In step S705, the input operation mapping unit 407 notifies the event processing unit 408 of the command converted in step S704. At this time, the input operation mapping unit 407 also notifies the event processing unit 408 of information on the three-dimensional position and the attitude of the operation device 120 or a hand together with the command where necessary. The event processing unit 408 performs processing corresponding to the notified command to control the display of the HMD 100.

Next, the processing of the exclusive control of the input operations in step S703 will be described in detail with reference to the FIG. 7B.

In step S706, the input operation mapping unit 407 extracts input operations performed by the right hand from the plurality of input operations received in steps S701 and S702. For example, the input operation mapping unit 407 extracts the input operation of the three-dimensional position and attitude or the button/OTP of the operation device 120 retained by or attached to the right hand and the input operation of the three-dimensional position and attitude, gesture, or the like by the hand tracking of the right hand. Here, when extracting an input operation by the operation device 120 (called a first input operation) and an input operation by hand tracking (called a second input operation), the input operation mapping unit 407 confirms whether the first input operation and the second input operation compete with each other.

In the example of FIG. 5, "the depression of the button A of the XX controller (RIGHT)," "the depression of the button B of the YY controller (RIGHT)," and "the pinch gesture of hand tracking (right hand)" are assigned to "SELECT," and are in a competitive relationship. Further, "the three-dimensional position and attitude for displaying a ray of the XX controller (RIGHT)," "the three-dimensional position and attitude for displaying a ray of the YY controller (RIGHT)," and "the three-dimensional position and attitude for displaying a ray of hand tracking (right hand)" are also in a competitive relationship.

When the first input operation and the second input operation compete with each other, the input operation mapping unit 407 employs any of the first input operation and the second input operation according to priorities set in a priority table. In the example of FIG. 6, the input operation mapping unit 407 employs "the three-dimensional position and attitude for displaying a ray of the XX controller (RIGHT)" when receiving "the three-dimensional position and attitude for displaying a ray of the XX controller (RIGHT)" and "the three-dimensional position and attitude for displaying a ray of hand tracking (RIGHT)." Note that "the three-dimensional position and attitude for displaying a ray of hand tracking (right hand)" that is the input operation not employed by the input operation mapping unit 407 is discarded.

In step S707, the input operation mapping unit 407 extract input operations performed by the left hand from the plurality of input operations received in steps S701 and S702. For example, the input operation mapping unit 407 extracts the input operation of the three-dimensional position and attitude or the button/OTP of the operation device 120 retained by or attached to the left hand and the input operation of the three-dimensional position and attitude, gesture, or the like by the hand tracking of the left hand. Like the exclusive control of the right hand, the input operation mapping unit 407 employs any of a first input operation and a second input operation according to priorities set in the priority table when extracting the first input operation and the second input operation that are in a competitive relationship.

According to the present embodiment described above, the employment of any of a plurality of input operations that are in a competitive relationship is determined on the basis of priorities set in advance when the plurality of input operations are received. Accordingly, it is possible to prevent the occurrence of a plurality of commands (control instructions) contradictory to each other and avoid the malfunction of control, the occurrence of abnormality, or the like beforehand. Thus, it is possible to perform both an input operation by an operation device and an input operation by hand tracking in combination without problems and provide an XR system having excellent convenience and operability.

The present invention is described in detail above on the basis of its preferred embodiments but is not limited to these specific embodiments. Various modes within the range of the gist of the invention are also included in the present invention. Some of the embodiments described above may be appropriately combined together.

Note that the respective function units of the above embodiments may be or may not be separate hardware. The functions of at least two function units may be realized by common hardware. Each of a plurality of functions of one function unit may be realized by separate hardware. At least two functions of one function unit may be realized by common hardware. Further, respective function units may be or may not be realized by hardware such as an ASIC, an FPGA, and a DSP. For example, a device may have a processor and a memory (storage medium) in which a control program is stored. Further, the functions of at least some function units of the device may be realized when the processor reads a control program from the memory and runs the read program.

According to the present disclosure, it is possible to perform both an input operation by an operation device and an input operation by hand tracking in combination.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-154733, filed on Sep. 28, 2022, which is hereby incorporated by reference herein in its entirety.

What is claimed is:

1. A control device connected to or embedded in a head-mounted display, the control device comprising at least one memory and at least one processor which function as:
    a reception unit configured to be capable of receiving an input operation by an operation device that is a wearable-type device attached to a first hand of a user and an input operation by hand tracking of the first hand to which the operation device is attached; and a determination unit configured to determine, when simultaneously receiving the input operation by the operation device attached to the first hand and the input operation by the hand tracking of the first hand, which of the input operation by the operation device attached to the first hand or the input operation by the hand tracking of the first hand is employed as an input operation used to control an information processing system on a basis of priorities set in advance; and a providing unit configured to offer the input operation used to control the information processing system, which is determined by the determining unit, to an application.

2. The control device according to claim 1, wherein the at least one memory and the at least one processor further function as:

a conversion unit configured to convert the input operation employed by the determination unit into a command on a basis of mapping information in which a corresponding relationship between an input operation receivable by the reception unit and a command that represents control instructions to the information processing system is defined, and wherein, in the mapping information, an input operation with the same movement in each of a case performed by a right hand, a case performed by a left hand, and a case performed by both hands, is assigned to a different command.

3. The control device according to claim 2, wherein the determination unit is configured to determine which of a first input operation and a second input operation is employed on a basis of the priorities when simultaneously receiving the first input operation by the operation device and the second input operation by the hand tracking and when the first input operation and the second input operation correspond to a same command in the mapping information.

4. The control device according to claim 1, wherein the determination unit is configured to perform processing to determine an input operation of a right hand to be employed from an input operation of the right hand by an operation device retained by or attached to the right hand and an input operation of the right hand by hand tracking of the right hand and processing to determine an input operation of a left hand to be employed from an input operation of the left hand by an operation device retained by or attached to the left hand and an input operation of the left hand by hand tracking of the left hand.

5. The control device according to claim 1, wherein the input operation by the operation device includes an operation to change a direction of the operation device, the input operation by the hand tracking includes an operation to change a direction of a hand, and the control of the information processing system includes control to change a direction of a computer graphic displayed on a display device provided in the information processing system according to a direction of the operation device or the direction of the hand.

6. The control device according to claim 5, wherein the computer graphic is a computer graphic expressing a direction pointed by a hand of a user with a ray.

7. The control device according to claim 1, wherein the operation device is a ring-type device.

8. The control device according to claim 1, wherein the operation device is a wrist-watch-type device.

9. The control device according to claim 1, wherein the priorities are set so that the input operation by the operation device is given a higher priority over the input operation by the hand tracking.

10. The control device according to claim 1, wherein the priorities are settable by a user.

11. The control device according to claim 1, wherein the determination unit determines, when simultaneously receiving the input operation by the operation device attached to the first hand and the input operation by the hand tracking of the first hand, whether the input operation by the operation device attached to the first hand and the input operation by the hand tracking of the first hand can be interpreted as commands contradictory to each other, and wherein the determination unit determines, when it is determined that the input operation by the operation device attached to the first hand and the input operation by the hand tracking of the first hand are interpreted as commands contradictory to each other, whether the input operation by the operation device attached to the first hand or the input operation by the hand tracking of the first hand is employed as an input operation used to control an information processing system on a basis of priorities set in advance.

12. The control device according to claim 11, wherein the determination unit determines whether the input operation by the operation device attached to the first hand and the input operation by the hand tracking of the first hand may be simultaneously detected and can be interpreted as commands contradictory to each other.

13. The control device according to claim 11, wherein the at least one memory and the at least one processor further function as an extraction unit configured to extract input operations performed by the first hand from the input operations received by the reception unit, and wherein the determination unit determines, when the extraction unit extracts the input operation by the operation device attached to the first hand and the input operation by the hand tracking of the first hand, whether the input operation by the operation device attached to the first hand and the input operation by the hand tracking of the first hand can be interpreted as commands contradictory to each other.

14. The control device according to claim 1, wherein a hand gesture is determined by detecting the position, attitude, and movement of a finger of a hand on the basis of the color and shape of the hand of the user reflected in a captured image.

15. A control method for a control device connected to or embedded in a head-mounted display, the control method comprising:

receiving an input operation by an operation device that is a wearable-type device attached to a first hand of a user;

receiving an input operation by hand tracking of the first hand to which the operation device is attached;

determining, when simultaneously receiving the input operation by the operation device attached to the first hand and the input operation by the hand tracking of the first hand, whether the input operation by the operation device attached to the first hand or the input operation by the hand tracking of the first hand is employed as an input operation used to control an information processing system on a basis of priorities set in advance; and offering the determined input operation used to control the information processing system to an application.

16. A non-transitory computer-readable medium storing a program causing a processor to execute a control method for a control device connected to or embedded in a head-mounted display, the control method comprising:

receiving an input operation by an operation device that is a wearable-type device attached to a first hand of a user;

receiving an input operation by hand tracking of the first hand to which the operation device is attached;

determining, when simultaneously receiving the input operation by the operation device attached to the first hand and the input operation by the hand tracking of the first hand, whether the input operation by the operation device attached to the first hand or the input operation by the hand tracking of the first hand is employed as an input operation used to control an information processing system on a basis of priorities set in advance; and offering the determined input operation used to control the information processing system to an application.

\* \* \* \* \*